8820X
Bayliss & Brannan,
Riding Saddle,
Patented May 16, 1835.
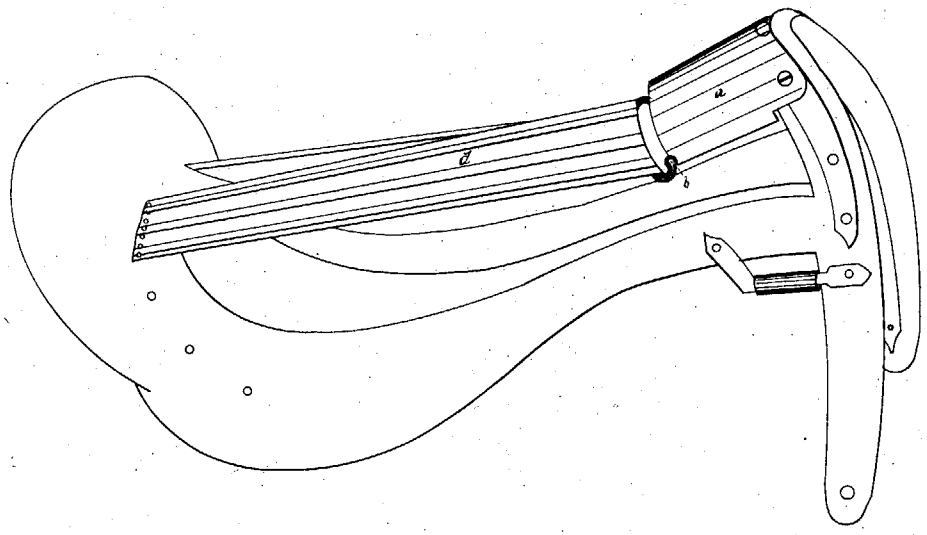
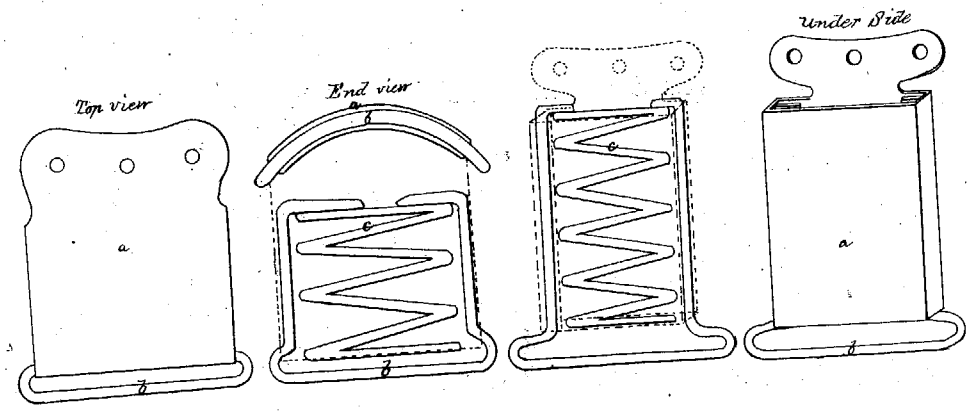
N. PETERS, PHOTO-LITHOGRAPHER, WASHINGTON, D. C.

Marshall Bayless and William Brannan [illegible]
[illegible] Citizens of the United States.

Letters } Improvement in the Saddle Seat Spring
Patent } Date of Patent May 15, 1855.
No 387 } [illegible] of [illegible] May 15 1855.

The Schedule referred to in these Letters Patent and making part of the same containing a description in the words of the said Marshall Bayless and William Brannan themselves of their improvement in the Saddle Seat Spring.

~~~~~~~~~~

To all to whom these Presents shall come: Be it known that we Marshall Bayless and William Brannan of Fredericksburg in the County of Spottsylvania and State of Virginia have invented a new and useful improvement in the Saddle Seat Spring, and that the following is a full, clear and exact description of the construction and operation of the said [illegible] as invented or improved by us. [illegible] to the [illegible] of such size as [illegible] and durable to the strength of spring required. The case will be long, wide and thin in order to suit the shape of the spring [illegible]. It will be open at one end and closed at the other, (except [illegible] which [illegible] may be necessary at each side of the end for the passage of a small [illegible]) [illegible] a spring [illegible] the [illegible] of the [illegible] formed by the end [illegible] the [illegible]
~~~~~~~~~~

[illegible]

[illegible] shape [illegible] thus formed by bending the [illegible]
[illegible] [illegible] inside [illegible] and to keep [illegible]
[illegible] as to [illegible] the [illegible] to be applied to it.
The spring [illegible] into the curve or shape [illegible]
[illegible] [illegible] is passed into the case and
[illegible] to the bottom end of the compression
the [illegible] end of the rod forming the eye is bent
over it on that end at the open part of the
case and thereby retains it in that situation
[illegible] [illegible] spring the bed for the purpose of [illegible]
the operation of the spring may be [illegible]. The
projection of the case at the open end is made
to be securely fastened to the pommel of the [illegible]
[illegible] and the webbing or [illegible] [illegible] through
the case and from thence to the other [illegible] of
the saddle tree so that the weight of the rider
causes the action and reaction of said spring to
the [illegible] of the webbing.

What we claim as our invention in the above
described improvement is the combination and
arrangement as set forth consisting of the [illegible]
[illegible] or [illegible] [illegible] spring the manner of [illegible]
[illegible] it [illegible] by means of the [illegible] of the rod
and the case as described to contain the [illegible]

In testimony that this is a full and
exact description of the principle of construction
and mode of application of that principle to
saddle tree springs as invented and discovered
by us we have hereunto set our hands this fourth
day of March [illegible] eighteen hundred and thirty five Witnesses — Marshall [illegible]
Wm. M. [illegible] — William [illegible]
[illegible]

([illegible])